(12) United States Patent
Aguirre et al.

(10) Patent No.: US 8,533,341 B2
(45) Date of Patent: Sep. 10, 2013

(54) SYSTEM AND METHOD FOR MODELING, MONITORING AND MANAGING TELECOMMUNICATIONS NETWORKS AND INFRASTRUCTURE

(75) Inventors: Andres Aguirre, Coral Gables, FL (US); Alberto Noa, Hialeah, FL (US)

(73) Assignee: Netopex, Inc., Coral Gables, FL (US)

( * ) Notice: Subject to any disclaimer, the term of this patent is extended or adjusted under 35 U.S.C. 154(b) by 872 days.

(21) Appl. No.: 11/873,988

(22) Filed: Oct. 17, 2007

(65) Prior Publication Data

US 2009/0103700 A1    Apr. 23, 2009

(51) Int. Cl.
*G06F 15/16*    (2006.01)

(52) U.S. Cl.
USPC .................. 709/227; 709/228; 709/229

(58) Field of Classification Search
USPC ........................................ 455/405
See application file for complete search history.

(56) References Cited

U.S. PATENT DOCUMENTS

| | | | |
|---|---|---|---|
| 5,345,380 A * | 9/1994 | Babson et al. ................ 700/90 |
| 6,195,697 B1 * | 2/2001 | Bowman-Amuah .......... 709/224 |
| 6,556,659 B1 * | 4/2003 | Bowman-Amuah ......... 379/9.04 |
| 6,697,858 B1 * | 2/2004 | Ezerzer et al. ................ 709/224 |
| 6,891,940 B1 * | 5/2005 | Bhandari et al. ......... 379/142.06 |
| 6,975,619 B1 * | 12/2005 | Byers et al. ................... 370/351 |
| 7,065,496 B2 * | 6/2006 | Subbloie et al. ............. 705/7.35 |
| 7,120,694 B2 * | 10/2006 | Sinha ............................ 709/228 |
| 7,243,144 B2 * | 7/2007 | Miyake ......................... 709/223 |
| 7,370,105 B2 * | 5/2008 | Lebourg et al. ............... 709/224 |
| 7,437,449 B1 * | 10/2008 | Monga et al. ................. 709/224 |
| 2002/0161903 A1 * | 10/2002 | Besaw .......................... 709/229 |
| 2004/0193512 A1 * | 9/2004 | Gobin et al. .................... 705/29 |
| 2008/0037442 A1 * | 2/2008 | Bill ................................ 370/254 |
| 2008/0049641 A1 * | 2/2008 | Edwards et al. .............. 370/253 |
| 2008/0214140 A1 * | 9/2008 | Caveney et al. .............. 455/402 |
| 2011/0085556 A1 * | 4/2011 | Breslin et al. ................. 370/400 |
| 2011/0255611 A1 * | 10/2011 | Caveney et al. .............. 375/257 |

* cited by examiner

*Primary Examiner* — Backhean Tiv
(74) *Attorney, Agent, or Firm* — Edwards Wildman Palmer LLP; Howard M. Gitten

(57) ABSTRACT

An analyzing a telecommunications network that receives environmental data, vendor data, and customer data related to a telecommunications transaction. A telecommunications transaction identifier is generated for each telecommunications transaction to determine attributes associated with each telecommunications transaction. The telecommunications transaction identifier and the attributes associated with the identified telecommunications transaction are mapped to a customer-specific parameter. The telecommunications network determines whether the transaction conforms to the parameters.

10 Claims, 5 Drawing Sheets

SYSTEM AND METHOD FOR MODELING, MONITORING AND MANAGING TELECOMMUNICATIONS NETWORKS AND INFRASTRUCTURE

BACKGROUND OF THE INVENTION

This invention is directed to a methodology and system for monitoring the use of telecommunications equipment across a network, and in particular, for monitoring and graphically representing usage compliance with vendor and customer rules.

Today's telecommunication systems foster an environment of misinformation, inaccuracies, and complexity that are at best difficult and at worst impossible to manage. Current telecommunications environments are made up of multiple legacy systems that have been patch worked together throughout the years. This has provided an environment where errors and inconsistency are prevalent but difficult to identify and resolve. This enables an environment that lacks controls, management and visibility. Vendors provide application such as AT&T Business Direct®, Sprint FONVIEW®, AT&T Bill Management System®, Sprint PCS EBT®, Nextel Smart CD+®, Verizon PerspectivePlus® and others. These applications provide only basic querying capabilities and do not provide any graphical representation of the network, its uses or mechanisms to establish customer specific business rules and/or parameters. Additionally, they only represent data and information from the specific vendor and do not provide for the integration of data for multiple vendors into a single source.

BRIEF SUMMARY OF THE INVENTION

A system for modeling and managing a telecom network includes a server having a database. The server receives and normalizes customer data from various sources. The server stores the data in the database. The data includes information identifying customer characteristics and demographics; vendor services and characteristics and environmental data that define the characteristics and attributes of the customer telecommunications infrastructure. The data is normalized and categorized across key service categories such as, local, long-distance, data, Internet and mobile. The server generates multiple reports and graphic representations of the telecommunications infrastructure and usage as a function of the information. The reports provide capacity (usage), cost information, compliance/audit (contract and policy) and allows for analysis across vendors and services. Once logged in to the server all reports and analytics are available across all telecommunications services.

In a preferred embodiment, the server receives environmental data, vendor data, and customer data related to a telecommunications transaction. The server generates a transaction type identifier for each telecommunications transaction. The server determines attributes associated with each telecommunications transaction and maps the transaction type identifier and the associated attributes to a customer-specific parameter group and based on this information, determines whether the transaction type identifier and attribute conform to the parameters; i.e., is telecommunication usage in compliance with the expected parameters.

In another embodiment of the invention, the server receives vendor data related to a customer telecommunications transaction and determines attributes associated with each telecommunications transaction. Based on the information, the server generates a graphic representation of a customer telecommunications infrastructure as a function of the vendor data. The graphic representation is then validated utilizing environmental data and customer data received at the server.

Additionally, the application provides for billing based on performance data and baseline information gathered at time of input/loading. The server then generates billing/invoicing based upon on established criteria.

BRIEF DESCRIPTION OF THE DRAWINGS

For a fuller understanding of the invention, reference is had to the following description taken in connection with the accompanying drawings in which.

DETAILED DESCRIPTION OF THE INVENTION

A user, typically a company or other organization, utilizes a variety of telecommunications products and services such as Internet, intranet, local access networks and wide area networks, by way of example. Each may be provided by different vendors, each with their own rules and conditions regarding both usage and business terms. The products and services may include one or all of landline telephones, cellular telephones, Internet communications (both between computers and voiceover Internet protocols), and personal digital assistants such as Blackberry®, iPhone® or the like.

Figure 1:
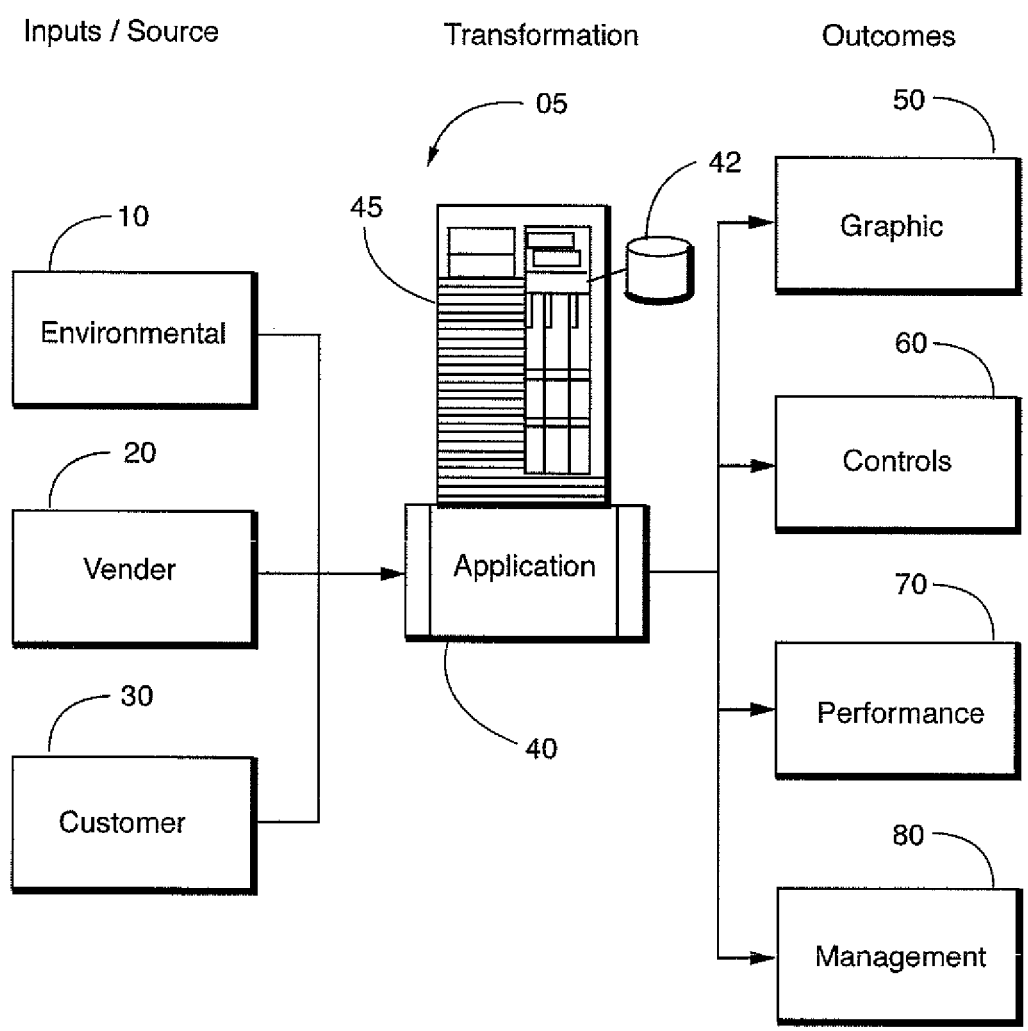
FIG. 1 is a schematic drawing of a system constructed in accordance with the invention.

A system, generally indicted as 25, as shown in FIG. 1, is an exemplary schematic representation of a system in accordance with an embodiment of the invention that graphically represents the system for monitoring and managing telecommunications infrastructure. A server 45 receives data from multiple sources; telecommunications service and equipment vendors 20, environmental information (information that is complementary and not necessarily coming directly from the vendor or the customer, such as central office locations, service types, locations types, customer address validation, and the like by way of non-limiting example) 10 and telecommunications customer information 30, and stores all necessary data and information to perform an application 40 at server 45 in a database 42 associated with server 45. The application 40 normalizes the data and information for loading into database 42. The stored information is then analyzed by server 45 utilizing application 40 to create multiple reports 60,70,80, and graphic outputs 50. These reports correspond in one embodiment to four major categories and/or functions; graphic representation (graphic representation of the customer's telecommunications network and associated transaction key attributes) 50, controls (audit and contract compliance) 60, performance (key performance and operational metrics/indicators) 70, and management (policy adherence, compliance and planning information) 80.

Figure 2:
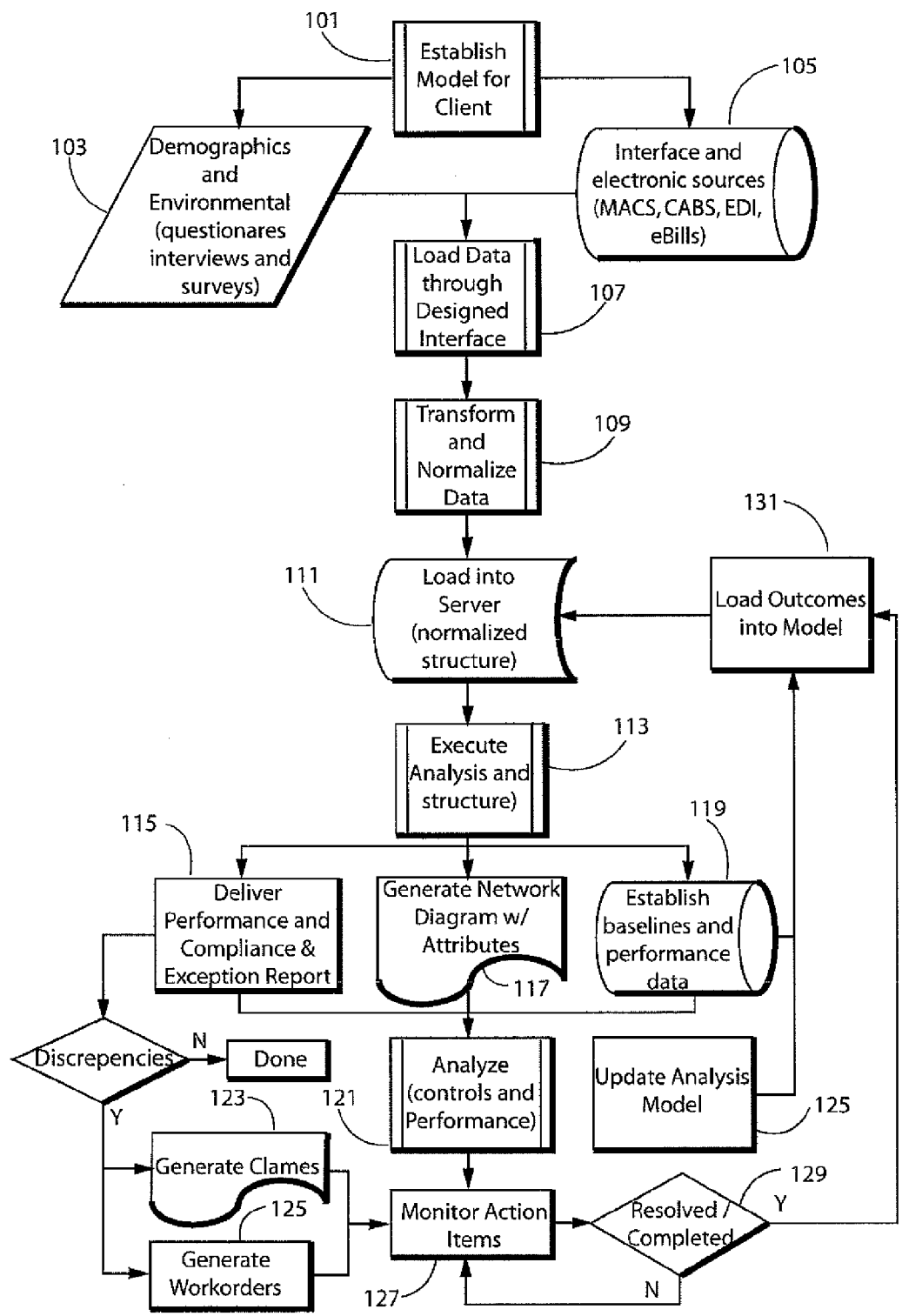
FIG. 2 is a flow chart of the process for receiving source data, transforming, normalizing and generating outcomes and reports in accordance with the invention.

Reference is now made to FIG. 2 in which a method in which server 45 performs application 40 in accordance with the invention is provided. An operational system is established. Database 42 provides the structure within system 25 to store the processed data and generate the normalized information model in application 40. Input sources vary depending on customer data 30 and vendor data 20. Each vendor has parameters associated with its service and contract, which are unique to the vendor at least in part. Similarly, customer data 30 is unique in part to the characteristics of a customer's physical and operational infrastructure and the customer's usage.

The process for establishing reports is started in a step 101. On parallel tracks, data is input to server 45 to be operated on by application 40. On one track, customer and vendor demographics 30, 20 and environmental information with respect to the vendors and the customer are input. They may be input manually in a step 103 through the submission of questionnaires to the customer and/or vendor, interviews and surveys of customer and/or vendor. The type of information solicited may be, by way of non-limiting example, the locations of parts of the IT infrastructure of the customer, responsible persons for reporting, billing and oversight of the network, or the like. The manual input is performed in step 103.

Simultaneously, or in parallel with the step 103, information may be uploaded electronically through interfaces and electronic sources such as magnetic tapes, CABs, electronic bills, and EDI. With the appropriate interfaces, the electronic bills for a particular customer from each vendor may be directly electronically downloaded in step 105. In step 107, both of these types of data are loaded onto server 45 through a designated interface.

Figure 3:
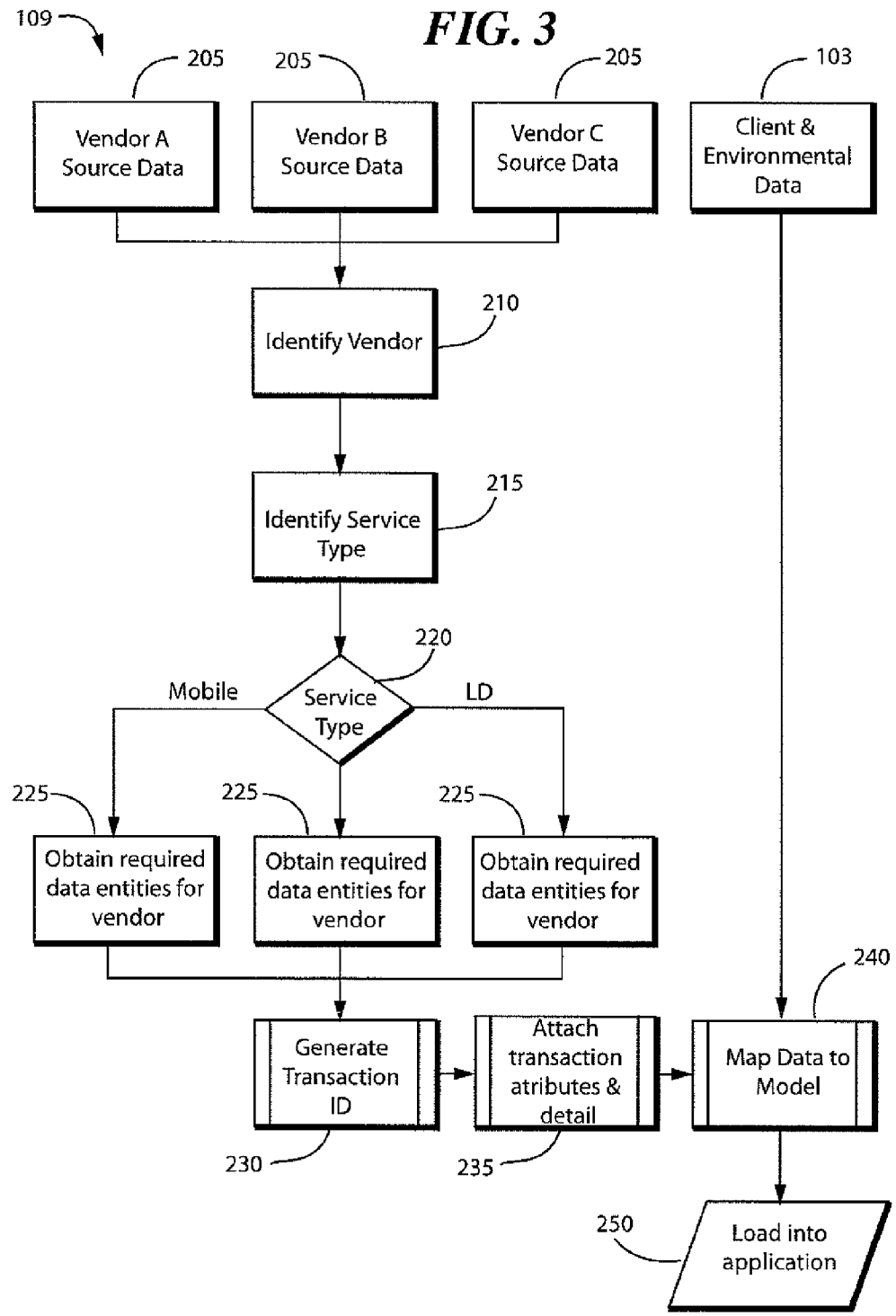
FIG. 3 is an operational diagram of the transformation and normalization process in accordance with the invention.

Once data is gathered from the various sources in step 107, the data is normalized and transformed in a step 109 utilizing application 40 in step 111 and as shown in more particular detail in FIG. 3. As a prelude to step 109, source data 20 from a variety of vendors A-C is received in a step 205 (FIG. 3). This data is transformed and normalized by applying developed logic that resolves the multiple data entities 20,30 from the individual vendors and customers who are dependent on the vendor and/or types of services provided. A unique telecommunication transaction ID that identifies the specific detailed telecommunications transaction and service is generated as a function of vendor information 20 and customer information 30.

The normalization process begins by identifying the vendor in a step 210 and the service type supplied by that particular vendor in a step 215. It is determined whether or not the service is mobile, long distance (LD) or fixed (all remaining types of service). In a step 225, the required data entities for vendor and service are obtained from the input information. The data entities are those characteristics or parameters explained below which are associated with the vendor products and services.

Figure 5:
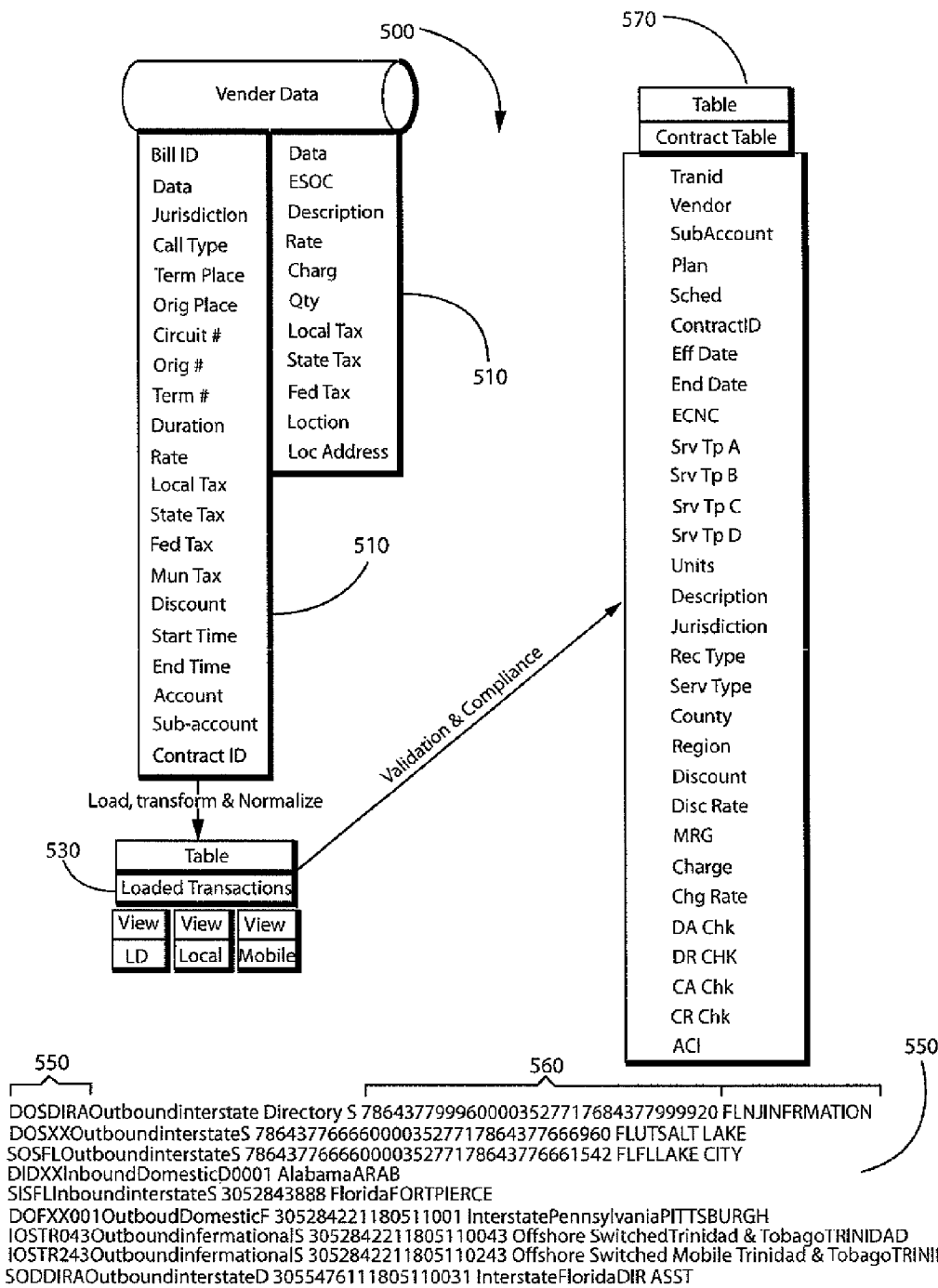
FIG. 5 is schematic data level representation of the transformation and normalization of source vendor data in accordance with the invention.

Reference is now made to FIG. 5, wherein a schematic diagram of the data normalization tables, which are created in accordance with the invention, are provided. Vendor data 510 is collected from the data entry steps 103, 105 and 107. Vendor data 510 includes substantially all relevant information from the vendor including bill identification, the call types provided by the vendor for that particular service, the originating place and termination place allowed by the vendor, circuit information, tax information, any sales or discount rates, start times and end times for the service, and the contract ID, by way of example. However, not all of the information is required for each type of service or telecommunication product. Therefore, in step 225, the vendor data is screened as it applies to the various types of services; long distance, land and mobile, to create loaded transaction tables 340. These tables contain the vendor parameters associated with specific telecommunications transaction types.

Each communication and event such as a phone call, a page, or an e-mail communication is identified as a distinct telecommunication transaction. In other words, a transaction corresponds to each discreet use of a telecommunication or service by the customer/end user for which a vendor charges the customer. The data entities required to process a transaction are culled from vendor data 510 and are normalized in step 109 to form loaded transaction tables 530. The loaded transaction tables include the vendor information, telecommunication transaction IDs and attributes.

In a step 230, a telecommunication transaction ID is generated from input vendor information such as the customer bills. The telecommunication transaction ID is transaction-type specific, not customer- or vendor-specific to allow grouping and comparisons of transactions across customers and vendors. As seen from exemplary transaction IDs 550, a code is created or adopted as the ID. The IDs 550, preferably are functional in that they describe a telecommunication transaction type, such as DOSDIRA, which corresponds to domestic outbound service directory assisted. In comparison, SISFL may stand for state inbound switched Florida. It should be noted that standard IDs such as USOC codes may be adopted as the IDs 550.

All transactions have attributes 560. Where IDs 550 are generic identifiers for a class of telecommunications transaction, attributes 560 are specific information associated with each transaction. Attributes 560 as shown in exemplary transaction IDs 550 may include a series of numbers corresponding to the circuit number, the call date, the duration, the charge amount, the origination and termination numbers or any personal identification number (PIN) associated with the specific telecommunications transaction. In step 235 the telecommunications transaction ID codes 550 are mapped and stored with the attributes 560 associated with that transaction.

As previously stated, in a step 103, vendor, customer and environmental data had been entered, stored, and loaded onto server 45. As a result, contract tables 570 are created which are a representation of the expected terms of the contract covering any service or product which in turn covers each telecommunication transaction. The table elements may include information such as the transaction rates, the discount, and any limitations on the type of transactions, such as after a certain date in which the contract has lapsed or before a certain date in which the contract does not come into effect, or calls at restricted originations or terminations such as impermissible foreign calls.

Therefore, in a step 240, each telecommunication transaction and associated attribute 560 is mapped against the input data in table 570 for validation and compliance and the mapped data is loaded into application 40 in step 111. Environmental data includes the locations at which products are used or services are provided. A customer physical infrastructure map is created.

In step 240, the transaction data is also compared to the physical infrastructure as input in step 103 as environmental information 10 to determine whether legitimate locations are involved in the telecommunication transaction.

Returning to FIG. 1 in a step 113, an analysis report is executed and generated. There are varieties of reports, which may be generated in step 113. There are performance reports 70 (performance reports 70 include compliance), there is the graphic representation of the network report 50, there are the controls report 60, and there is a report from management which is a management report 80.

In a step 115, utilizing the normalized data, performance and compliance reports 70 are generated. The performance and compliance reports may be utilized in a step 120 to determine whether in fact use of the telecommunications network complies with the parameters of the controlling contracts. By comparing the contract table values 570 with the report based upon the telecommunication transaction identification 550 and attributes 560 loaded as transaction table 530 in database 42, a comparison is made to determine whether or not there are any discrepancies. If there are no discrepancies then the process for that report is over. If there is a discrepancy, then in a step 123 claims are generated to be transmitted to the vendor and work orders as a function of stored customer policies are generated in a step 125. The claims and work orders become action items, which are monitored in a step 127. Step 127 can be done manually or by server 45 with "tickles" and "updates" and reminders to both the vendor and the customer until it is determined in step 129 whether the action item has been resolved.

If the action item has been resolved or completed then the outcomes are loaded into a model 131, the outcomes provide updated information, establishing an accurate representation of the telecommunications infrastructure and its operational and contracted parameters, which is loaded into server 45 as a feedback and background to generate further reports as part of process 111. If the action item has not been completed or resolved, then it is continued to be monitored in step 127 until resolution.

Figure 4:
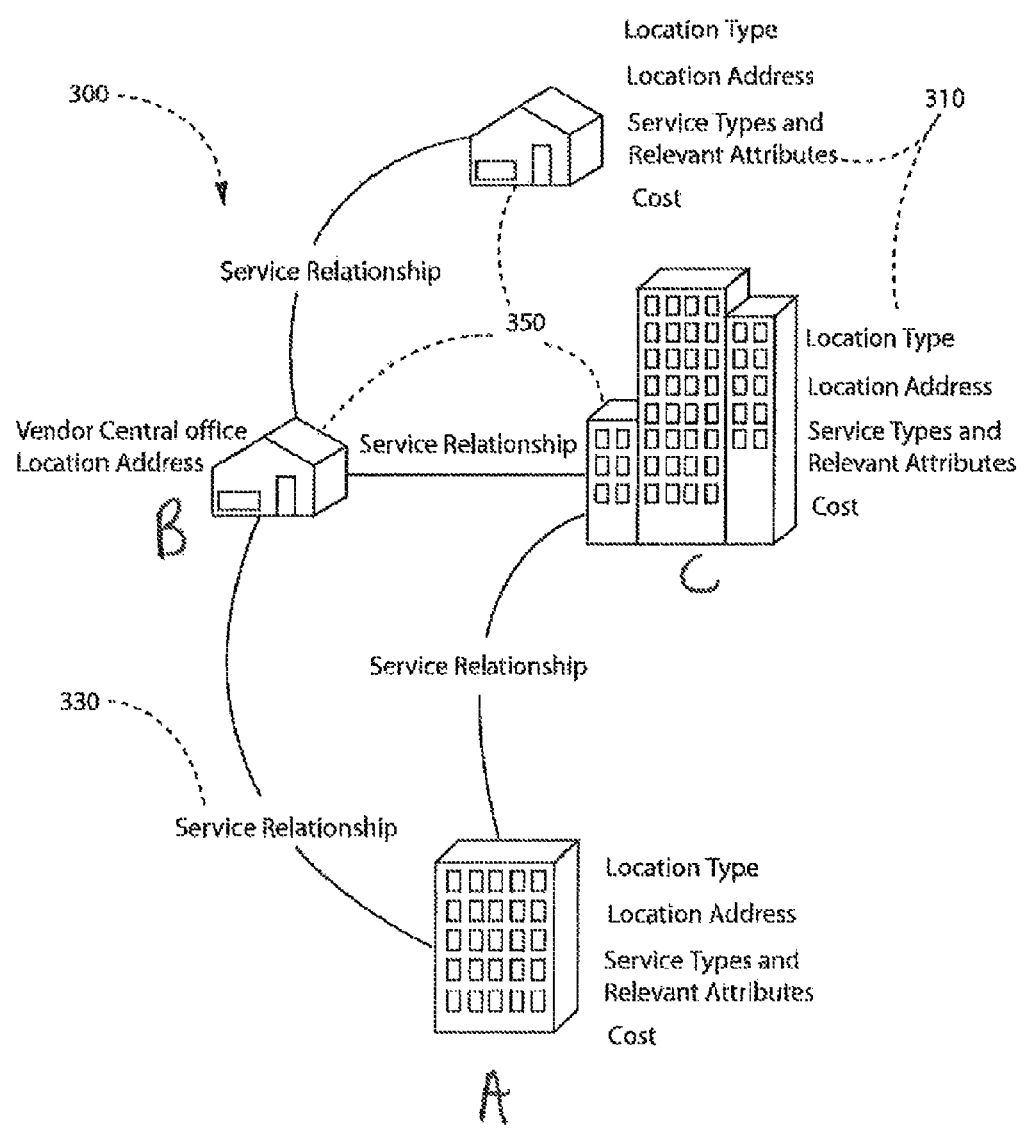
FIG. 4 an exemplary representation of a graphic representation of the network in accordance with the invention.

Utilizing the environmental data gathered in step 103 and the data entities for each vendor in a step 225, and the tables 510, 530 created in step 225, a graphic representation of the customer telecommunications infrastructure with attributes 560 is created as shown in FIG. 4.

A simplified network is shown in FIG. 4 to facilitate discussion. The graphic representation 300 is a graphic representation of the entire telecommunications infrastructure serviced by application 40. Each facility 350 represents a physical customer facility location at which contracted telecommunication equipment and services are utilized. It could be an office building or a customer employee home where Internet and cellular phone services are utilized. In a preferred embodiment, different icons may be used to correspond to different types of facilities. Service relationship 330, i.e., type of service such as Primary Rate Interface (PRI), Terrestrial Interoffice Facility Level 1 (T-1), Internet Protocol Multiprotocol Label Switching (IP MPLS), Asynchronous Transmission Mode (ATM), Frame Relay (FR), Metro Ethernet and the like are shown. The graphic representation is based upon vendor information 20 and environmental information 10 input in step 103, 105 and culled in steps 225 and 240. The relationships are graphically shown as connections between appropriate facilities 350. Furthermore, the key attributes and environmental information for each facility may be graphically represented as text 310. This may include the location type, the physical address of the location, the service types and relevant attributes for each transaction. The location type may be a user home, a central office, a satellite office or the like. The cost for running each facility may also be presented.

This data may be utilized as the baseline report in a step 119. It may then be used to measure performance, either initially or through later reports in step 119. This baseline is used in order to make a model of the entire network and input into the model in a step 131 and then is then loaded into server 45 to refine the analysis and reports generated in step 113.

The performance and compliance report generated in a step 115, the graphic report generated in a step 117, and the baseline and performance data generated in a step 119 are analyzed in a step 121 to produce performance report 70 and controls report 60 (this analysis may be done manually or automated). These reports contain performance metrics to be compared against. established targets and best practices. Control reports would provide data that would be validated (test compliance) against. external contracts and service level agreements (vendors), and internal policies and service level agreements.

The controls and performance reports are utilized to update a model generated in step 115 in a step 125 so that the model keeps refining itself. The performance and control reports will allow for refinement of targeted and expected results; redefining and reevaluating targets, defining new more impactful measures, additional compliance testing (new policies or redefined business rules)

By analyzing the network on a transaction-by-transaction basis, along with key attributes and characteristics, the model and system allow for the preparation for in depth analyses across multiple perspectives, such as services, vendors, usage, locations and the like. By providing a graphic representation of the analysis, manual analysis, understanding and correction are expedited.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments.

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed as new and desired to be protected by Letters Patent of the United States is:

1. A method for analyzing a telecommunications network comprising the steps of:

providing a server and a remote computer;

the server receiving environmental data, vendor data, and customer data related to a telecommunications transaction, the environmental data including infrastructure information;

the server generating a telecommunications transaction identifier for each telecommunications transaction as a function of at least one of the vendor data and the customer data;

the server determining attributes associated with each telecommunications transaction as a function of at least one of the customer data and the vendor data;

the server determining a customer infrastructure information as a function of the environmental data;

mapping the telecommunications transaction identifier and the attributes associated with the identified telecommunications transaction to a customer-specific parameter, the customer specific parameter including the customer infrastructure information;

the server generating a graphic representation of a physical customer infrastructure and the attributes including a graphical representation of at least one service relationship between a first facility and an at least a second facility as at least one connection between the first facility and at least second facility;

the server utilizing the graphic representation to determine whether the telecommunications transaction conforms to the customer specific parameters; and transmitting the graphic representation to the remote computer.

2. The method for analyzing a telecommunications network of claim 1, wherein environmental data includes at least one of vendor office locations, customer locations, and service types.

3. The method for analyzing a telecommunications network of claim 1, further comprising the step of obtaining required data entities for the vendor and generating the transaction type identifier as a function of the required data entities.

4. The method for analyzing a telecommunications network of claim 3, further comprising the steps of:
   determining the customer specific parameter from the required data entities;
   creating a contract table for a transaction; and
   comparing the telecommunications transaction identifier and the associated attributes to the parameters in the contract table to determine whether the telecommunications transaction conforms to the parameters.

5. The method of analyzing a telecommunication network of claim 4, further comprising the steps of:
   generating a work order when the telecommunications transaction does not conform to the parameters and transmitting the work order to a vendor associated with the telecommunications transaction.

6. The method of analyzing a telecommunication network of claim 1, wherein the telecommunication transaction identifier identifies the type of telecommunications transaction identified.

7. The method of claim 1, wherein the graphic representation includes a first icon and at least a second icon, the first icon graphically representing the first facility and the at least second icon graphically representing the at least second facility.

8. The method of claim 7, wherein the service relationships are shown as connections between the first icon and the at least second icon.

9. The method of claim 1, wherein the graphic representation includes key attributes and environmental information associated with a facility, graphically represented as text adjacent a respective icon.

10. The method of claim 1, wherein the graphic representation includes text corresponding to key attributes and environmental information.

* * * * *